Dec. 16, 1969  N. S. NAMEROW  3,483,860
METHOD FOR MONITORING INTRASOMATIC CIRCULATORY
FUNCTIONS AND ORGAN MOVEMENT
Filed Nov. 2, 1964  2 Sheets-Sheet 1

INVENTOR.
NORMAN S. NAMEROW
BY
Edward A. Sokolski
ATTORNEY

INVENTOR.
NORMAN S. NAMEROW

United States Patent Office 3,483,860
Patented Dec. 16, 1969

3,483,860
METHOD FOR MONITORING INTRASOMATIC CIRCULATORY FUNCTIONS AND ORGAN MOVEMENT
Norman Stanley Namerow, 552 Kelton Ave., Los Angeles, Calif. 90024
Filed Nov. 2, 1964, Ser. No. 407,958
Int. Cl. A61b 6/00; G01f 1/00
U.S. Cl. 128—2.05                                    3 Claims

ABSTRACT OF THE DISCLOSURE

Radio frequency energy is radiated into a portion such as, for example, the heart or lung of a human or animal body, this energy being received after it has passed into and out of this body portion and been modulated in accordance with the variation in shape, content, volume and movement thereof. This received energy is displayed on an indicator device to provide an indication of the function of such body portion.

Figure 1:
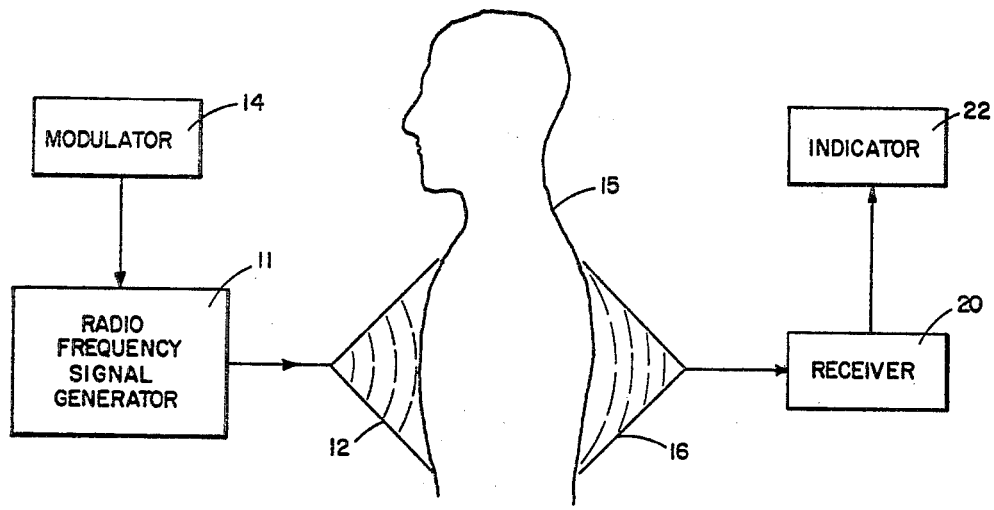

This invention relates to a method for monitoring intrasomatic circulary functions and organ movement, and more particularly to such method and apparatus by which the desired output signal is achieved by passing a radio frequency signal through the organ in question and detecting the modulation produced on such signal by the movement and functioning of such organ.

Various techniques have been employed to check the performance of vital organs of the human body, such as the heart, in an effort to detect malfunctions of such organs, for diagnostic purposes, early enough to institute effective corrective therapy. In effectively checking the function of the human circulatory system, it is not only important to assess the contraction action of the heart but also to verify the nature of the blood flow therefrom to assure that proper circulation is occurring. Thus, quite often the heart may show a strong contraction and yet due to an alteration in the dynamics of the blood flow therefrom caused, for example, by such factors as heart valve disease, a weak or damaged cardiac muscle, or increased peripheral resistance in the circulatory system, circulation may be abnormal.

The electrocardiograph, which is probably the most commonly used instrument for measuring cardiac action, measures the electrical potential incidental to heart action and thus provides essential information as to the operation of the heart. This instrument does not, however, indicate the blood flow dynamics including the blood ejection rate from the heart, which information, as indicated above, is essential in determining the efficiency of the circulatory system.

Techniques of the prior art which are used to measure the actual flow of blood through the circulatory system have several disadvantages and shortcomings. Flow meters and catheterization techniques both involve surgery with hazards and patient discomfort incidental thereto. Other techniques involving the injection of dye or radioactive material into the blood stream are relatively inaccurate in determining the function of the circulatory system, provide discomfort to the patient, and can provide only a limited number of readings at any given time. Plethysmographic techniques, which involve measurements of changes in either the electrical impedance or the physical volume of a portion of the body in determining blood flow, while not involving surgery or any great degree of discomfort to the patient, have questionable accuracy due to the deleterious effects on the output readings of movement of the body and changes in skin contact impedance (in the case of electrical impedance measurements). X-ray techniques for observing the action of the heart have limited accuracy and cannot be utilized but for short periods of time due to the radiation hazards incidental thereto.

The method of this invention overcomes the shortcomings of prior art devices and techniques in providing means for continually monitoring the blood flow volume and ejection rate from the heart. Such monitoring can be accomplished over relatively long periods of time with a minimum of discomfort to the patient. In addition, there is no danger of hazard in view of the lack of dangerous radiation involved and the lack of any necessity for surgical procedures or penetration of the skin. Accurate measurements of blood flow dynamics are possible with the device of the invention which have heretofore been unavailable. The desired end result is achieved in the device of the invention by transmitting low power radio frequency waves into the bodily organ to be monitored, receiving these waves after they have passed through the organ and displaying the demodulated signals on an appropriate indicator device such as an oscilloscope or pen recorder. Such radio waves are modulated in accordance with changes in the blood volume in the organ involved and in accordance with the motion of such organ and other organs surrounding it. Such modulation is achieved by virtue of the variation resulting in dielectric path through which the radio wave passes, such variation being a function of the amount of blood, tissue and air in such path and the movement of the bodily organs. While the device of the invention is described in connection with the monitoring of cardiac action, and experimentation along these lines has proven successful, there is a good possibility that it may be utilized to equal advantage in checking the function of the lungs or other organs involving movement and variations in blood and tissue volume.

It is therefore an object of this invention to provide an improved method for monitoring intrasomatic circulatory functions and organ movement in a human or animal body.

It is a further object of this invention to provide an improved method for monitoring cardiac function capable of continuous monitoring of such function without any hazard to the patient.

It is a still further object of this invention to provide an improved method for monitoring bodily organ function involving minimum discomfort to the patient.

It is still another object of this invention to provide an improved method for monitoring bodily function through which there is no requirement for surgical procedures or piercing of the subject's skin.

It is still a further object of this invention to provide a method for checking cardiac function capable of producing an output signal indicative of the blood flow dynamics including the blood ejection rate from the heart.

Figure 2:
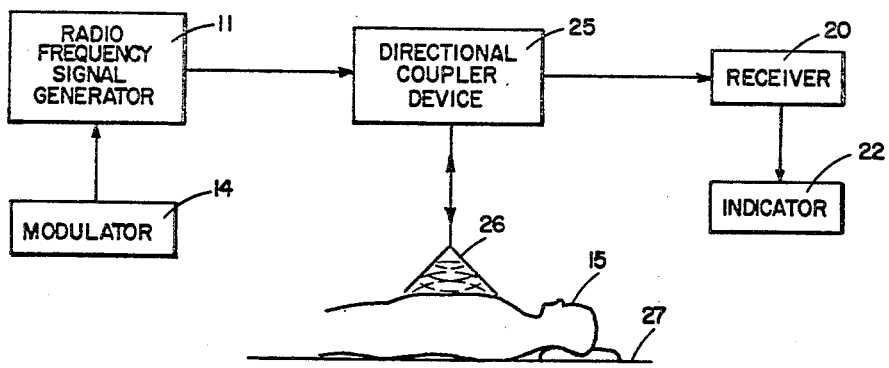
Figure 3:
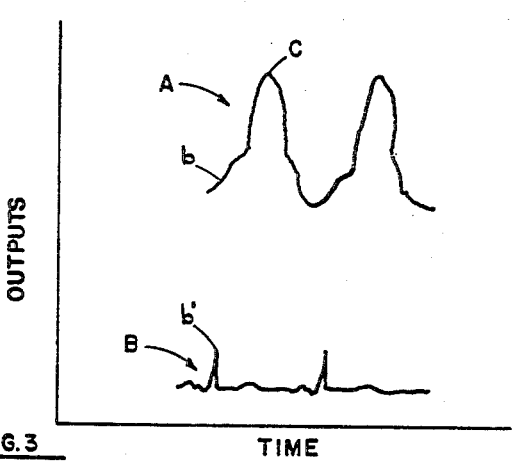
Figure 4:
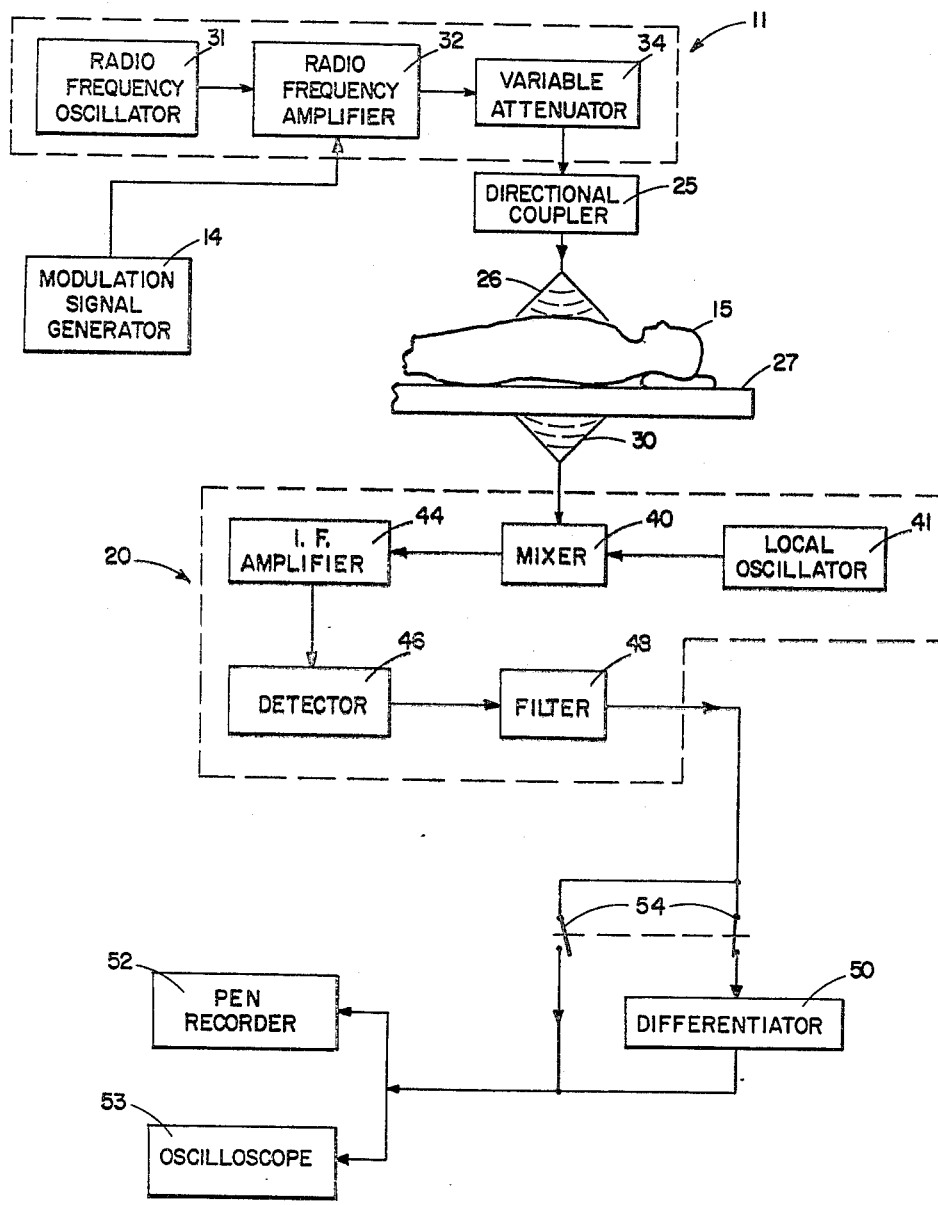

Other objects of this invention will become apparent from the following description taken in connection with the accompanying drawings of which:

FIG. 1 is a block diagram illustrating a first embodiment of the device of the invention, FIG. 2 is a block diagram of a second embodiment of the device of the invention, FIG. 3 is a graphical illustration of typical output signals obtained with the device of the invention as compared with an electrocardiograph, and FIG. 4 is a block diagram showing the details of circuitry of an embodiment of the device of the invention in accordance with the configuration shown in FIG. 1.

Referring now to FIG. 1, a block diagram of a first embodiment of the device of the invention is shown. Radio frequency signal generator 11 generates radio frequency signals at a relatively low power output (for example, several milliwatts) and these signals are fed to antenna 12. The radio frequency signals generated by generator 11 are modulated by the output of modulator 14 at a steady audio frequency which may for example be 1,000 cycles. Such audio frequency modulation is utilized to provide a convenient carrier for the output information which can readily be viewed on an ordinary oscilloscope. Usable outputs have been obtained without such modulation. The choice of the output frequency for radio frequency signal generator 11 is predicated on several factors. At the higher microwave frequencies, more power output is required to produce the desired signal at the indicator, this in view of the higher propagation attenuation of biological tissues at such frequencies. At such higher frequencies, therefore, larger and more powerful transmitting equipment is required and a danger of radiation hazard to the subject may be presented. On the other hand, at lower frequencies, larger and bulkier antennas are required to produce the desired directivity of the energy. Problems incidental to the use of such large antennas are therefore a factor in mitigating against the use of too low a radiation frequency. It has been found by experimentation that a frequency of about 1,000 megacycles appears to satisfy the desired requirements, enabling the use of wave guide horn-type antennas 12 and 16, and low enough power output to avoid the necessity for large and cumbersome transmitting equipment and without any danger of radiation hazard to the subject.

Radio frequency energy radiated by antenna 12, which as already noted may comprise a wave guide section flared out to form a horn, is passed through the body of subject 15 and after having been passed through the subject's body is received by antenna 16, which is similar in configuration to antenna 12. Antennas 12 and 16 are placed opposite the organ to be monitored, i.e., the heart where cardiac measurements are desired. The radio frequency energy is modulated in accordance with the heart action as it passes through the subject's body. Such modulation is a function of two factors: (1) The variation in the amount of blood, tissue and air in the radiation path as the heart goes through its pumping cycle, and (2) the movement of the heart and adjacent bodily organs in this path. Along these lines, it may be desirable to have the subject hold his breath for a short period of time while measurements are being made to avoid respiratory influences on the signal; or if desired, respiratory signals, produced by the lungs can be appropriately filtered out. This can be accomplished with a simple electrical filter circuit, in view of the difference in frequency between the respiratory and cardiac rates.

The modulated signals received by antenna 16 are appropriately amplified and demodulated in receiver 20, the modulation envelope being impressed on a carrier at the audio output frequency of modulator 14. The output of receiver 20 is fed to indicator 22 where it is appropriately displayed. Indicator 22 may comprise a cathode ray oscilloscope, a pen recorder, or a combination of both.

Referring now to FIG. 2, a second embodiment of the device of the invention is shown. In the second embodiment, only a single antenna is utilized and the signals are both transmitted and received by this antenna and appropriately channeled by a directional coupler device. Like components are identified by like numerals in FIGS. 1 and 2. Radio frequency signal generator 11 and modulator 14 operate similarly to the modulator and signal generator of FIG. 1 in producing a radio frequency output signal modulated at a steady audio frequency. The output of radio frequency signal generator 11 is fed through directional coupler device 25. Directional coupler device 25 may comprise a conventional directional coupler such as described, for example, on pp. 10–30 through 10–35 of "Principles of Radar," 2nd edition written by the M.I.T. Radar School Staff and published by McGraw-Hill Book Company. Directional coupler device 25 is utilized to couple radio frequency signal generator 11 and receiver 20 to antenna 26 so that signals transmitted by the signal generator are coupled to the antenna but are not fed to the receiver while signals received by the antenna are fed only to receiver 20. Thus a single antenna can be utilized for both transmitting and receiving.

Antenna 26 is placed against the chest of subject 15, who is in a reclining position on table 27. The transmitted signals are passed from antenna 26 into the heart and adjoining thoracic regions of the subject and a portion of such signals is reflected back to the antenna, such signals being modulated in accordance with the heart action. As in the embodiment illustrated in FIG. 1, the output of receiver 20 is fed to indicator 22 where signals in accordance with heart action are appropriately displayed.

Referring now to FIG. 3, typical wave forms obtained on the indicator of the device of the invention in monitoring heart action are illustrated. The graph line indicated as A is a signal appearing on the indicator of the device of the invention, such indicator being either a cathode ray oscilloscope or a pen recorder. The graph line marked B represents an electrocardiogram. Graphs A and B are shown in proper relative time sequence. The pulse marked $b^1$ in the electrocardiogram indicates the heart pumping impulse which occurs at the start of the ventricular pumping cycle. This corresponds, as will be noted to the point $b$ in graph A. Both the electrocardiogram and the indicator of the device of the invention thus indicate the start of the contraction of the heart. The device of the invention, however, additionally provides information in accordance with the blood flow dynamics which is not furnished by the electrocardiogram. Thus, the rise between points $b$ and $c$ of graph A is indicative of the actual flow of blood achieved by the heart action and the slope of the graph between points $b$ and $c$ is indicative of the actual rate of ejection of the blood. Such information is a direct indication of the efficiency of the circulatory system and is not available from the electrocardiogram. If desired, the output of receiver 20 can be differentiated prior to display on the indicator and this differentiated output will then be a direct indication of the slope of the curve and therefore the blood ejection rate.

Referring now to FIG. 4, a block diagram of the details of an embodiment of the device of the invention in accordance with FIG. 1 is shown. Radio frequency oscillator 31 may be a conventional vacuum tube or transistor oscillator producing output signals at, for example, 1,000 megacycles. The output of radio frequency oscillator 31 is fed to radio frequency amplifier 32, where it is appropriately amplified. Radio frequency amplifier 32 has a relatively low output of, for example, several milliwatts. The output of radio frequency amplifier 32 is fed to variable attenuator 34 where it is appropriately attenuated to produce the desired output to directional coupler 25. Variable attenuator 34 may comprise a device such as a ferrite rod attenuator. Directional coupler 25 which, as already noted, may be such a coupler as described in "Principles of Radar," cited above, couples radio frequency signals from signal generator 11 to antenna 26. The directional coupler effectively isolates the signal generator from the effects of reflected signals which might be received by antenna 26. Antenna 26 may comprise a flared wave guide section which forms a radiating horn.

The signals received by antenna 30 from the body of subject 15, which are appropriately modulated in accordance with the subject's cardiac function, are fed to mixer 40 of receiver 20. Oscillator 41 provides a signal to the input of the mixer which beats with signals from the antenna, thereby producing signals at the intermediate frequency which are fed to I.F. amplifier 44. Such signals, after having been appropriately amplified in I.F. amplifier 44, are fed to detector 46, where the modulation envelope is removed. Such modulation envelope includes the output of modulation signal generator 14, varied in amplitude by the heart action of subject 15. The receiver circuitry described thus far comprises a conventional superheterodyne circuit.

The output of detector 46 is fed to filter 48, where unwanted frequencies are filtered out. Filter 48 eliminates such unwanted signals as, for example, signals caused by pulmonary action and body movements. The output of filter 48 may be differentiated by means of differentiator 50, or may be passed directly to pen recorder 52 and oscilloscope 53 through switch 54. Switch 54 is a single-pole, double-throw switch which in one position (as shown in FIG. 4) connects the output of the filter to the differentiator and in the other position, connects such output directly to the pen recorder and oscilloscope. Differentiator 50 may comprise a conventional R-C differentiator circuit and is utilized to produce a signal which directly indicates the heart ejection rate. This as mentioned in connection with FIG. 3 is represented by the positive slope of the output signal. The output of either differentiator 50 or the output of filter 48, as the case may be, is fed to both pen recorder 52 and oscilloscope 53. Pen recorder 52 may be a conventional pen recorder device such as, for example, the Model "R" manufactured by the Offner Company. Oscilloscope 53 may be any oscilloscope having good response in the low frequency audio range.

In monitoring cardiac action the following procedure has been found to obtain satisfactory results: The subject is first placed in a reclining position on a table. A wave guide section which has been adapted to form an antenna is placed against the chest of the subject opposite the cardiac region. Radio frequency signals modulated by low frequency steady audio signals and of relatively low power (a few milliwatts) are fed to the antenna. Such radio waves which have passed through the cardiac regions are received by the same antenna element or another antenna element placed near the back of the subject opposite the first element. The radio waves so received are detected in a receiver and displayed on an indicator device such as a cathode ray oscilloscope or a pen recorder. If a single antenna is utilized for both transmitting and receiving, a directional coupler device is placed between the antenna and both the radio frequency signal generator and the receiver to properly couple signals to and from the antenna, at the same time effectively isolating the receiver from the direct output of the signal generator.

While the method and the device of the invention have been described in connection with monitoring cardiac action, they may be used to equal advantage in monitoring other organ movement and function, such as, for example, pulmonary action.

The device and method of this invention thus provides effective means for monitoring cardiac action and for producing information indicative of the blood flow dynamics including the blood ejection rate from the heart. Such monitoring can be conducted over reasonably long periods of time, without any significant discomfort to the patient or without any hazard to such subject. Information is provided by this method and apparatus which has heretofore been difficult or impossible to obtain.

I claim:

1. A method for monitoring the function of an organ of a human or animal body comprising
   placing a first radio frequency antenna having a radio transmitter connected thereto on one side of the body opposite the organ the function of which is to be monitored,
   placing a second radio frequency antenna having a radio frequency receiver connected thereto on an opposite side of the body and opposite said first antenna, said receiver being coupled to an indicator device,
   applying power to said transmitter to cause it to transmit radio frequency energy through the organ and the body portion in which the organ is located, directly modulating said energy in accordance with the variation in volume, shape and content of said organ and the movement thereof,
   receiving the energy in said receiver after it has passed through said organ and said body portion, and
   displaying the modulation pattern of the received energy on said indicator device.

2. A method for monitoring intrasonmatic circulatory and respiratory functions of a human or animal body comprising the steps of
   radiating radio frequency energy into the portion of said body to be monitored, directly modulating said energy in accordance with the variation in shape, content and volume thereof and the movement of said body portion,
   receiving said radio frequency energy after it has passed into and out of said body portion and been modulated in accordance with the variation in shape, content and volume thereof and the movement of said body portion, and
   displaying said received energy.

3. A method for monitoring the heart action of a body comprising
   radiating radio frequency energy into the heart, directly modulating said energy in accordance with the shape, volume, blood content and movement of said heart,
   receiving the energy so modulated, and displaying the received energy.

References Cited

UNITED STATES PATENTS

| | | | |
|---|---|---|---|
| 2,649,538 | 8/1953 | Marlowe et al. | |
| 2,826,753 | 3/1958 | Chapin | 340—258 |
| 3,046,519 | 7/1962 | Polster. | |
| 3,218,638 | 11/1965 | Honig | 128—2.1 X |

WILLIAM E. KAMM, Primary Examiner